United States Patent
Levitan et al.

(10) Patent No.: US 10,185,752 B2
(45) Date of Patent: *Jan. 22, 2019

(54) MINING ASSOCIATION RULES IN THE MAP-REDUCE FRAMEWORK

(71) Applicant: International Business Machines Corporation, Armonk, NY (US)

(72) Inventors: Svetlana Levitan, Skokie, IL (US); Dong Liang, Shaanxi (CN)

(73) Assignee: International Business Machines Corporation, Armonk, NY (US)

(*) Notice: Subject to any disclaimer, the term of this patent is extended or adjusted under 35 U.S.C. 154(b) by 796 days.

This patent is subject to a terminal disclaimer.

(21) Appl. No.: 14/696,157

(22) Filed: Apr. 24, 2015

(65) Prior Publication Data

US 2016/0092515 A1    Mar. 31, 2016

Related U.S. Application Data

(63) Continuation of application No. 14/500,330, filed on Sep. 29, 2014.

(51) Int. Cl.
G06F 17/30 (2006.01)

(52) U.S. Cl.
CPC .. *G06F 17/30539* (2013.01); *G06F 17/30106* (2013.01); *G06F 17/30292* (2013.01); *G06F 2216/03* (2013.01)

(58) Field of Classification Search
CPC ......... G06F 17/30539; G06F 17/30106; G06F 17/30292; G06F 2216/03
(Continued)

(56) References Cited

U.S. PATENT DOCUMENTS

| | | | | | |
|---|---|---|---|---|---|
| 5,615,341 A | * | 3/1997 | Agrawal | ........... | G06Q 30/02 705/7.29 |
| 2013/0254196 A1 | | 9/2013 | Babu et al. | | |
| 2014/0033223 A1 | | 1/2014 | Swart et al. | | |

FOREIGN PATENT DOCUMENTS

| | | |
|---|---|---|
| CN | 101996079 A | 3/2011 |
| CN | 101799810 B | 9/2012 |

(Continued)

OTHER PUBLICATIONS

Riondato et al., Article-"PARMA: A Parallel Randomized Algorithm for Approximate Association Rules Mining in MapReduce". CIKM '12 Proceedings of the 21st ACM international conference on Information and knowledge management, pp. 85-94. Oct. 29-Nov. 2, 2012 ACM New York, NY, USA © 2012. (Year: 2012).*

(Continued)

*Primary Examiner* — Evan Aspinwall
(74) *Attorney, Agent, or Firm* — North Shore Patents, P.C.; Joseph L. Acayan

(57) ABSTRACT

In each iteration of the process of mining association rules from transaction data by a cluster of computing systems, each mapper node in the cluster receives a split of the transaction data. Each mapper node scans the split to count an absolute support value of each candidate itemset for current search level(s), and passes the candidate itemsets and their support values to reducer nodes in the cluster. The number of reducer nodes will be determined adaptively based on the number of the candidate itemsets and the number of maximum available resource nodes in the cluster. Each reducer node combines the absolute support value of each candidate itemset, and finds frequent itemsets among them using a minimum support threshold. For each frequent itemset it finds, the reducer node creates association rule(s) satisfying a minimum confidence threshold, and exports all (Continued)

discovered frequent itemsets and association rules to a file system for storage.

6 Claims, 7 Drawing Sheets

(58) Field of Classification Search
USPC .......................................................... 707/738
See application file for complete search history.

(56) References Cited

FOREIGN PATENT DOCUMENTS

CN 102945240 A 2/2013
CN 103150163 A 6/2013

OTHER PUBLICATIONS

Lin et al., Article: "Apriori-based Frequent Itemset Mining Algorithms on MapReduce". ICUIMC '12 Proceedings of the 6th International Conference on Ubiquitous Information Management and Communication Article No. 76. ACM New York, NY, USA © 2012. (Year: 2012).*

"Map-Reduce Tutorial"; http://hadoop.apache.org/docs/r1.2.1/mapred_tutorial.html; Aug. 2014.

"PMML 4.1—Association Rules"; http://www.dmg.org/v4-1/AssociationRules.html; [retrieved Sep. 26, 2014].

Agrawal, R. et al; "Fast Algorithms for Mining Association Rules in Large Databases"; Proceedings of the 20th International Conference on Very Large Data Bases (VLDB); Santiago, Chile; Sep. 1994; pp. 487-499.

Han, J. et al; "Mining Frequent Patterns without Candidate Generation"; Proceedings of the 2000 ACM SIGMOD International Conference on Management od Data; vol. 29, Issue 2; Jun. 2000.

Hipp, J. et al; "Algorithms for Association Rule Mining—A General Survey and Comparision"; SIGKDD Explorations, vol. 2, Issue 1; Jul. 2000.

Li, N. et al; "Parallel Implementation of Apriori Algorithm Based on MapReduce"; 2012 13th ACIS International Conference on Software Engineering, Artificial Intelligence, Networking and Parallel/Distributed Computing; Aug. 2012.

Lin, M. et al; "Apriori-based Frequent Itemset Mining Algorithms on MapReduce"; ICUIMC 2012 Proceedings of the 6th International Conference on Ubiquitous Information Management and Communication Article No. 76; Feb. 2012.

Riondato, M. et al; "PARMA: A Parllel Randomized Algorithm for Approximate Association Rules Mining in MapReduce"; Proceedings of the 21st ACM International Conference on Information and Knowledge Management; pp. 85-94; Maui, HI; Nov. 2012.

Woo, J; "Apriori-Map/Reduce Algorithm"; The 2012 World Congress in Computer Science, Computer Engineering, and Applied Computing; Las Vegas, Nevada; Jul. 2012.

List of IBM Patents or Patent Applications Treated as Related.

Wang et al.; "TFP: An Efficient Algorithm for Mining Top-K Frequent Closed ltemsets," May 2005, IEEE Transactions on Knowledge and Data Engineering.

Wu et al.; "Top 10 Algorithms in data mining," Jul. 9, 2007 / Revised: Sep. 28, 2007 / Accepted: Oct. 8, 2007, Published online: Dec. 4, 2007.

Agarwal, Pragya et al., "Study on Apriori Algorithm and its Application in Grocery Store", International Journal of Computer Applications (0975-8887) vol. 74-No. 14, Jul. 2013.

Baker, Zachary et al., "Efficient Parallel Data Mining with the Apriori Algorithm on FPGAs", 13th Annual IEEE Symposium on Field-Programmable Custom Computing Machines (FCCM'05), Oct. 2005.

Yabing, Jiao, "Research of an Improved Apriori Algorithm in Data Mining Association Rules", International Journal of Computer and Communication Engineering, vol. 2, No. 1, Jan. 2013.

Singh, Sudhakar, et al., "Review of Apriori Based Algorithms on Map Reduce Framework", 2014 International Conference on Communication and Computing, 2014.

* cited by examiner

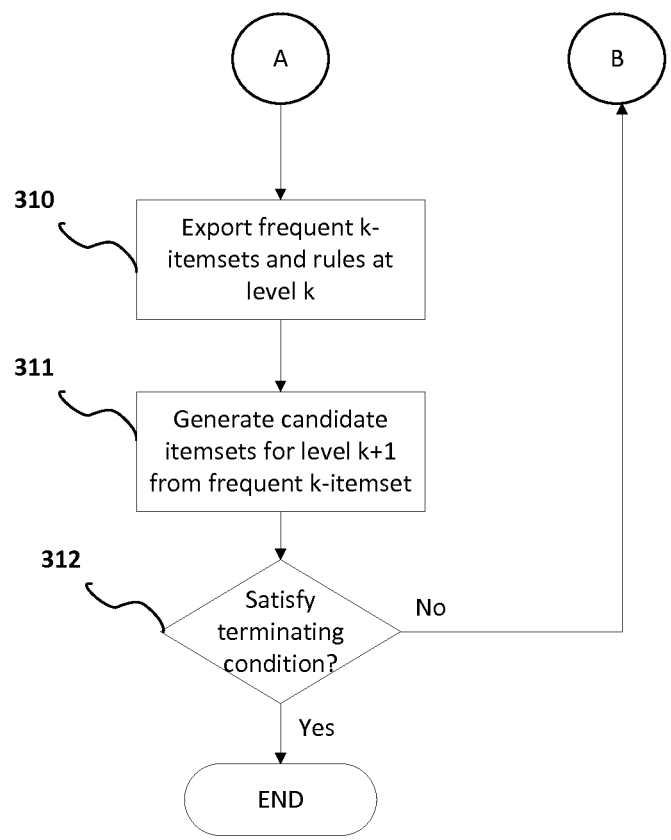
FIG. 3 (con't)

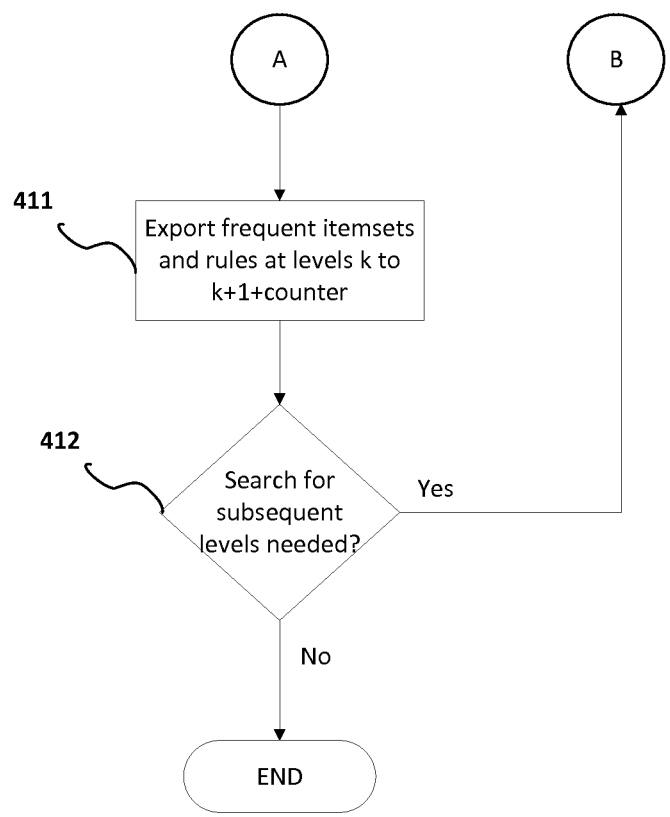
FIG. 4 (con't)

MINING ASSOCIATION RULES IN THE MAP-REDUCE FRAMEWORK

BACKGROUND

This invention relates to data analytics and modeling, in particular, this invention is related to the mining of association rules for items in a database.

In data mining, the association rules model is a popular and important technique for discovering interesting relationships between items in large databases. One application of association rules is discovering patterns of co-occurrence of products in large-scale transaction data recorded by point-of-sale systems in supermarkets or online stores in order to increase sales. For example, the rule {bread, potatoes}=>{butter} found in the sales data of a supermarket would indicate that if a customer buys bread and potatoes together, he or she is likely to also buy butter. Such information can be used as the basis for decisions about marketing activities such as promotional pricing or product placement. Other applications of association rules analysis are the extraction of important patterns in web usage or bioinformatics.

Generally, association rule mining has two main parts: (1) finding frequent itemsets with support at or above a minimum support; and (2) creating association rules from the frequent itemsets, using a minimum confidence. Association rule mining is defined as follows. Let $I=\{i_1, i_2, \ldots, i_n\}$ be a set of items. A subset of I is called an itemset. A rule is defined as an implication of the form $X \Rightarrow Y$ where $X, Y \subseteq I$ and $X \cap Y = \phi$. X and Y are called "antecedent" (left hand side) and "consequent" (right hand side) of the rule respectively. The "support" sup(X) of an itemset X is defined as the proportion of transactions in the data set which contain the itemset. The "confidence" of a rule is defined as $$conf(X \Rightarrow Y) = \frac{sup(X \cup Y)}{sup(X)},$$

where $sup(X \cup Y)$ means "support for occurrences of transactions where X and Y both appear". Typically, "minimum support" and "minimum confidence" are the main criteria specified for building association rules.

The Apriori algorithm is a well-known algorithm for finding frequent itemsets. This algorithm uses the fact that all subsets of a frequent itemset are also frequent. It is an iterative method, generating candidate (k+1)—itemsets from the frequent k-itemsets, then counting those candidate itemsets to find their support value and to select frequent itemsets. Every "layer search" at level k will scan a transaction table once to count the absolute support of k-itemsets. Then the infrequent k-itemsets (i.e., those having supports lower than the specified threshold) are removed. The remaining itemsets are frequent k-itemsets. Then the candidate (k+1)—itemsets are created based on the frequent k-itemsets, and the search at level k+1 starts. The algorithm stops when no candidate itemsets for the next level can be created or when a maximum rule size is reached. This algorithm however requires many data passes. A map-reduce framework may be used with the Apriori algorithm to improve its implementation. map-reduce is a programming model and an associated implementation for processing and generating large data sets with a parallel, distributed algorithm on a cluster. Iterative map-reduce jobs may be performed to find frequent itemsets The Apriori/map-reduce approach addresses the efficiency of the first part of association rule mining, where frequent itemsets are found by scanning the transaction dataset. The second part of association rule mining, the creation of mining rules based on the frequent itemsets, can also be time consuming when there is a large number of long frequent itemsets. It is because for each frequent k-itemset, there will be $2^k-1$ potential rules to be checked against the minimum confidence. However, the Apriori/map-reduce approach does not address the efficiency of the second part.

SUMMARY

According to one embodiment of the present invention, in a method for mining association rules from transaction data by a cluster of computing systems, each mapper node of a plurality of mapper nodes in the cluster receives a split of a plurality of splits of the transaction data. Each mapper node scans the split to count an absolute support value of each candidate itemset for one or more current search levels, and passes the candidate itemsets and the absolute support value of each candidate itemset to a plurality of reducer nodes in the cluster. Each reducer node combines the absolute support value of each candidate itemset received from each mapper node, and finds frequent itemsets for the one or more current search levels, the frequent itemsets comprising the candidate itemsets with the combined absolute support value satisfying a minimum support threshold. For each frequent itemset for the one or more current search levels, each reducer node creates one or more association rules satisfying a minimum confidence threshold, and exports each frequent itemset for the one or more current search levels and each created association rule to a file system for storage.

System and computer program products corresponding to the above-summarized methods are also described and claimed herein.

DETAILED DESCRIPTION

According to embodiments of the present invention, association rule mining utilizes the map-reduce framework to mine rules in parallel with the finding of frequent itemsets. Each map-reduce job not only finds frequent itemsets but also mines rules based on the frequent itemsets found. In this way, the workload of mining rules for a large number of frequent itemsets are divided among multiple map-reduce jobs and divided among multiple computers within the map-reduce framework.

Figure 1:
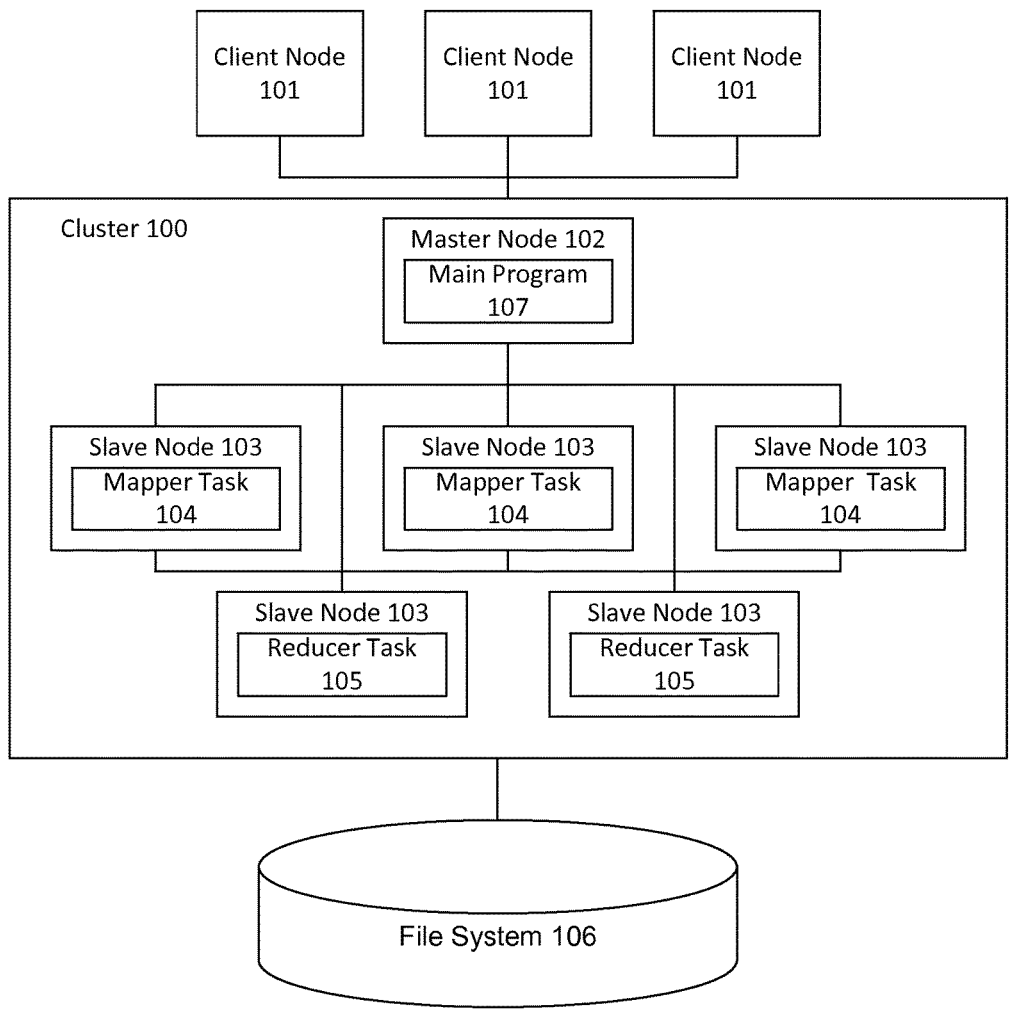
FIG. 1 illustrates a system implementing a map-reduce framework according to embodiments of the present invention.

FIG. 1 illustrates a system implementing a map-reduce framework according to embodiments of the present invention. The system includes a plurality of client nodes 101 coupled to a cluster 100 of nodes working in parallel. Each node may be a computer, a processor, or a processing unit such as a thread. The cluster 100 includes a master node 102 and a plurality of slave nodes 103, which performs "map-reduce jobs." A map-reduce job includes map tasks and reduce tasks. It usually splits the input dataset into independent chunks which are processed by the map tasks in parallel. The map tasks emit their results as sets of key-value pairs. The framework sorts the outputs of the map tasks by their keys, which are then input to the reduce tasks. The sorting of keys is called shuffling, it can be time-consuming when the number of map task results is very large. Map tasks process one split of the input dataset to count some statistical values, and reduce tasks consolidate the outputs from the map tasks into final results. The slave nodes 103 include a plurality of mapper nodes 104 and a plurality of reducer nodes 105. The master node 102 executes a main program 107, which divides a transaction dataset into smaller data chunks and distributes them to the mapper nodes 103. Each reducer node 105 combines the output received from the mapper nodes 104 into a single result. Each node in the cluster 100 is coupled to a shared file system 106. The results of each stage of the map-reduce job may be stored in the file system 106, and the nodes in the cluster 100 may obtain the results from the file system 106 in order to perform a subsequent stage.

Figure 2:
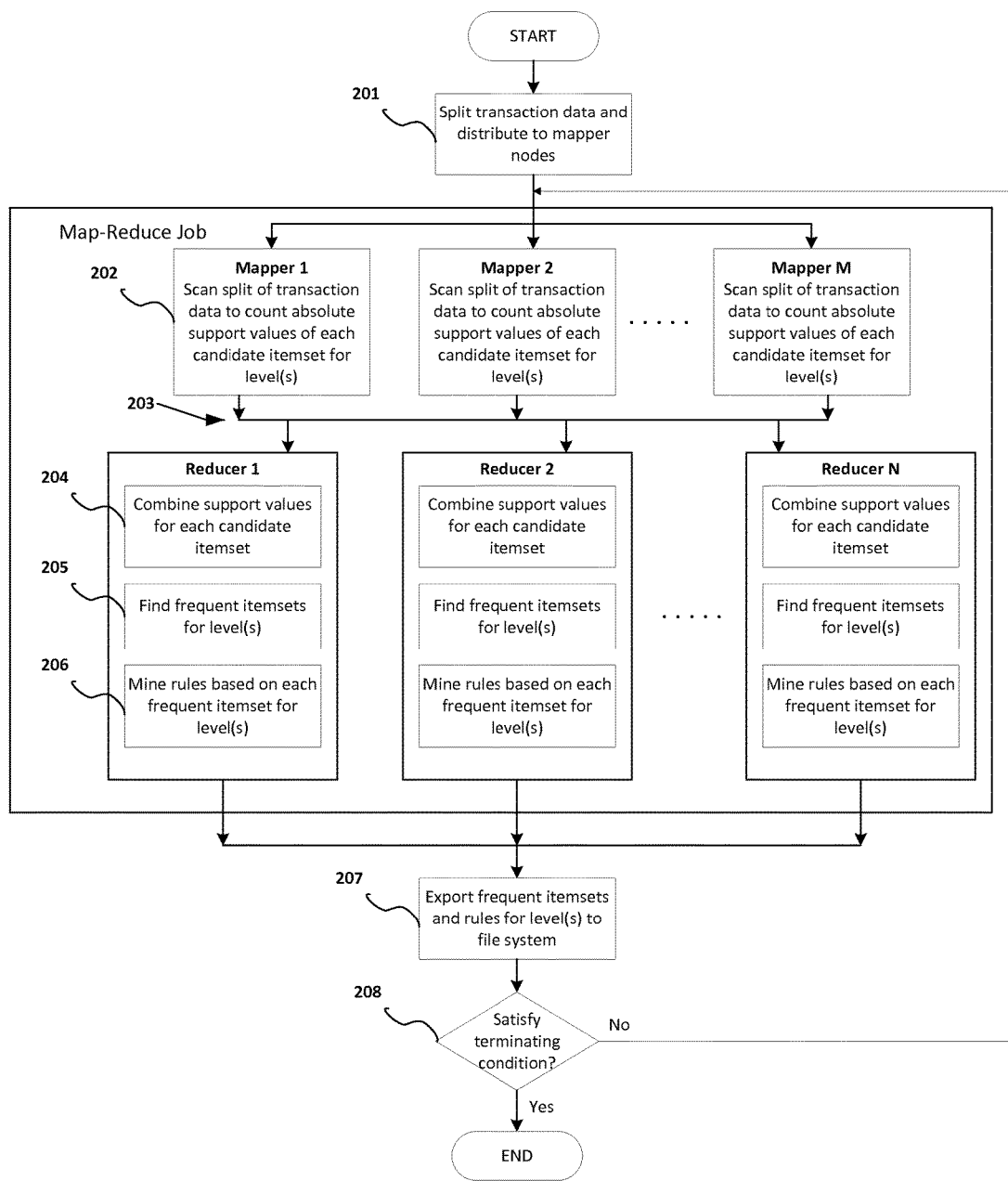
FIG. 2 illustrates a method for mining association rules in a map-reduce framework according to embodiments of the present invention.

FIG. 2 illustrates a method for mining association rules in a map-reduce framework according to embodiments of the present invention. Referring to FIGS. 1 and 2, first, transaction data is split and distributed to a plurality of mapper nodes 104 (mappers 1–M) (201). Each mapper node 104 scans its split of the transaction data to count the absolute support value of each candidate itemset for one or more levels of the Apriori layer search (202). Each mapper node 104 passes its candidate itemsets and their absolute support values to a plurality of reducer nodes 105 (reducers 1–N) (203). Each reducer node 105 combines the support values for each candidate itemset received from the mapper nodes 104 (204). Each reducer node 105 then finds frequent itemsets from the candidate itemsets based on their combined support values for the one or more levels (205). Here, the frequent itemsets are candidate itemsets with a combined support value that meets or exceed a minimum support threshold. Each reducer node 105 then mines for association rules based on each frequent itemset for the one or more levels (206). In creating the association rules, each reducer node 105 calculates the confidence for each potential candidate rule for each frequent itemset. An association rule is created when the confidence meets or exceeds a minimum confidence threshold. The frequent itemsets and association rules for the one or more levels are exported by each reducer node 105 to the file system 106 (207). The main program 107 obtains the frequent itemsets from the file system 106 and determines whether a terminating condition is satisfied (208). Here, the main program 107 generates candidate itemsets for the next level. If the next level does not contain any candidate itemsets, or if the maximum rule size (number of items in a rule) has been reached, then the terminating condition is satisfied, and the process ends. If the next level contains candidate itemsets, and the maximum rule size has not been reached, then the process 202-208 is repeated for the candidate itemsets for the next level.

Figure 3:
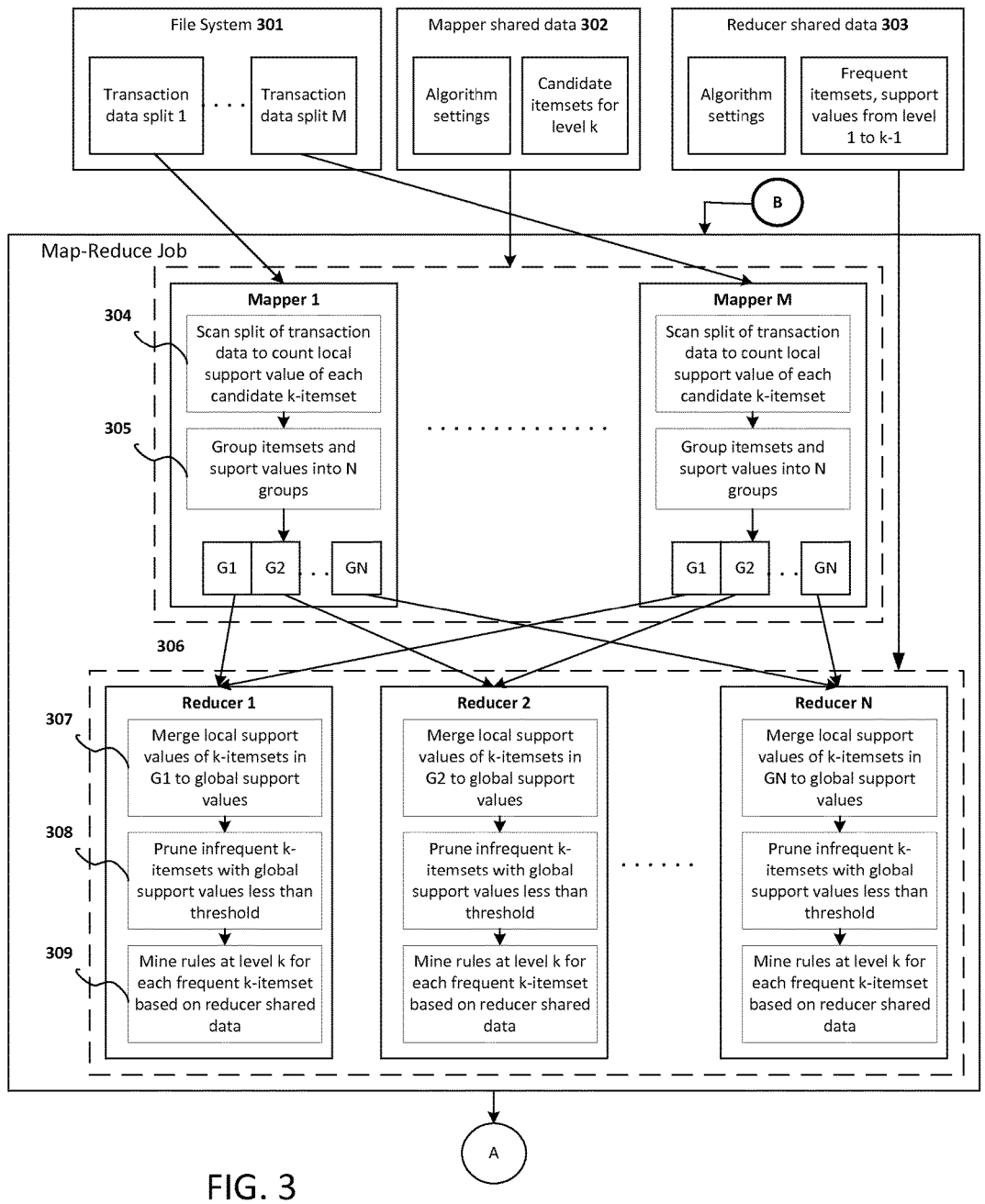
FIG. 3 illustrates in more detail the method for mining association rules in a map-reduce framework according to embodiments of the present invention.

FIG. 3 illustrates in more detail the method for mining association rules in a map-reduce framework according to embodiments of the present invention. Assume that the maximum rule size is L. The Apriori algorithm will search frequent itemsets from level 1 to level L. To search at level k ($1 \le k \le L$), the candidate itemsets with size k should be offered. For level 1, candidate 1-itemsets are all the items appearing in the transaction data. For level k>1, candidate k-itemsets are generated from frequent (k−1)—itemsets. Before running the map-reduce job at level k, the candidate itemsets, contained in mapper shared data 302 along with algorithm settings, are passed to each mapper node 104. Reducer shared data 303, which includes the frequent itemsets and support values from level 1 to k−1 and related algorithm settings, are passed to each reducer node 105. Here, the transaction dataset is stored in the file system 106 and can include several data blocks if it is a large dataset. The number of data blocks determines the number of mapper nodes 104 that will be driven in a map-reduce job. Every mapper node 104 at level k scans the data split passed to it in order to count the local absolute support value of each candidate k-itemset (304). Then, the candidate k-itemsets are grouped into N groups (305), where N is the number of reducer nodes 105 to be driven in the map-reduce job. The value N can be determined based on the number of candidate itemsets and should not exceed the reduce task capacity of the cluster 100. Since the number of candidate itemsets varies at different levels, the number of reduce tasks can vary at different levels accordingly with an adaptive strategy. This helps reduce tasks to realize suitable and balanced workloads. For example, suppose there are n candidate itemsets for level k. If p is percentage of the itemsets that are frequent, then there are $n \times (2^k-1) \times p\ \%$ possible rules. The value p could be an empirical value, such as 50%. Confidence values would then have to be computed $$\frac{n \times (2^k - 1)}{2}$$

number of times. The desired number of confidence value computations in one reduce task can be set to L, where L is an empirical value, such as L=5000. The number of reduce tasks would be $$N = \min\left\{\frac{n \times (2^k - 1) \times p\ \%}{L}, R\right\},$$

where R is the maximum number of reduce tasks that can run in parallel on the cluster 100.

In this embodiment, the candidate k-itemsets are divided into N groups approximately evenly. Each group will be passed to a certain reducer node 105 through a <key, value> pair, where the key is one of the integer numbers from 1 to N, and the value is the group. In this way, the same candidate itemset in different map tasks will be passed to one reduce task, and all the local absolute support values for the itemset will be collected in the same reducer node 105. Combining map task results in only N groups helps to reduce the work load of the shuffling phase.

Each reducer node 105 receives the groups with the same key from the plurality of mapper nodes 104 (306). Then the reduce task at each reducer node 105 merges the local support values of the k-itemsets into a global support value for every itemset (G1, G2, . . . GN) (307). Each reduce task prunes or removes the infrequent itemsets with global support values less than a minimum support threshold (308). In this embodiment, the threshold is based on the user-specified minimum support and is passed as part of the reducer shared data 303.

Once the frequent k-itemsets are found, each reduce task mines rules for the frequent k-itemsets found (309). The frequent itemsets and their support values from previous levels are needed for rule mining, as described further below, and this information is passed to every reducer node 105 as part of the reducer shared data 303. The frequent k-itemsets and rules at level k are then exported by each reducer node 105 to the file system 106 (310). The main program 107 collects this data from the file system 106. With the frequent k-itemsets, the main program 107 generates candidate itemsets for level k+1 (311). If no candidate itemsets for level k+1 can be generated, or if the maximum rule size has been reached, then the terminating condition is satisfied (312), and the iterative searching and mining process terminates. The main program 107 exports all rules mined for all levels to the file system. Otherwise, the candidate itemsets for level k+1 are passed to the next map-reduce job, and the process 304-312 is repeated.

More details on mining rules from frequent itemsets will now be described. Once the frequent itemsets from transactions in a database D have been found, association rules may be generated from them. This can be done using Equation (1) for confidence computing:

$$\text{confidence}(A => B) = P(B|A) = \frac{scount(A \cup B)}{scount(A)} \quad (1)$$

The conditional probability is expressed in terms of the itemset support count, where scount ($A \cup B$) is the number of transactions containing the itemset $A \cup B$, and scount (A) is the number of transactions containing the itemset A. Based on this equation, association rules based on a frequent itemset can be generated as follows:

(1) For frequent itemset l, generate all nonempty subsets of l.
(2) For every nonempty subset s of l, output the rule s=>(l-s) if $$\frac{scount(l)}{scount(s)} \geq \min\_conf,$$

where min_conf is the minimum confidence threshold. In the above, s is the antecedent of the rule, and (l-s) is the consequent of the rule.

Suppose the length (number of items) of a frequent itemset is k, then the number of possible candidate rules will be ($2^k-2$), if empty antecedent or empty consequent are not allowed in a rule. With an empty antecedent, there will be ($2^k-1$) possible candidate rules.

For example, suppose the data contain the frequent itemset l={I1, I2, I5}. The nonempty subsets of l are {I1, I2}, {I1, I5}, {I2, I5}, {I1}, {I2}, and {I5}. The potential possible association rules are as shown below, with each listed with its confidence:

I1 AND I2=>I5 confidence=50%
I1 AND I5=>I2 confidence=100%
I2 AND I5=>I1 confidence=100%
I1=>I2 AND I5 confidence=33%
I2=>I1 AND I5 confidence=29%
I5=>I1 AND I2 confidence=100%

If the minimum confidence threshold is 70%, then only the second, third, and last rules above are the final rules.

Although the present invention is described above in the context of the Apriori algorithm, the inventive approach may be used with other algorithms without departing from the spirit and scope of the present invention. For example, the inventive approach may be used with the Dynamic Passes Counting (DPC) algorithm, as described further below.

Figure 4:
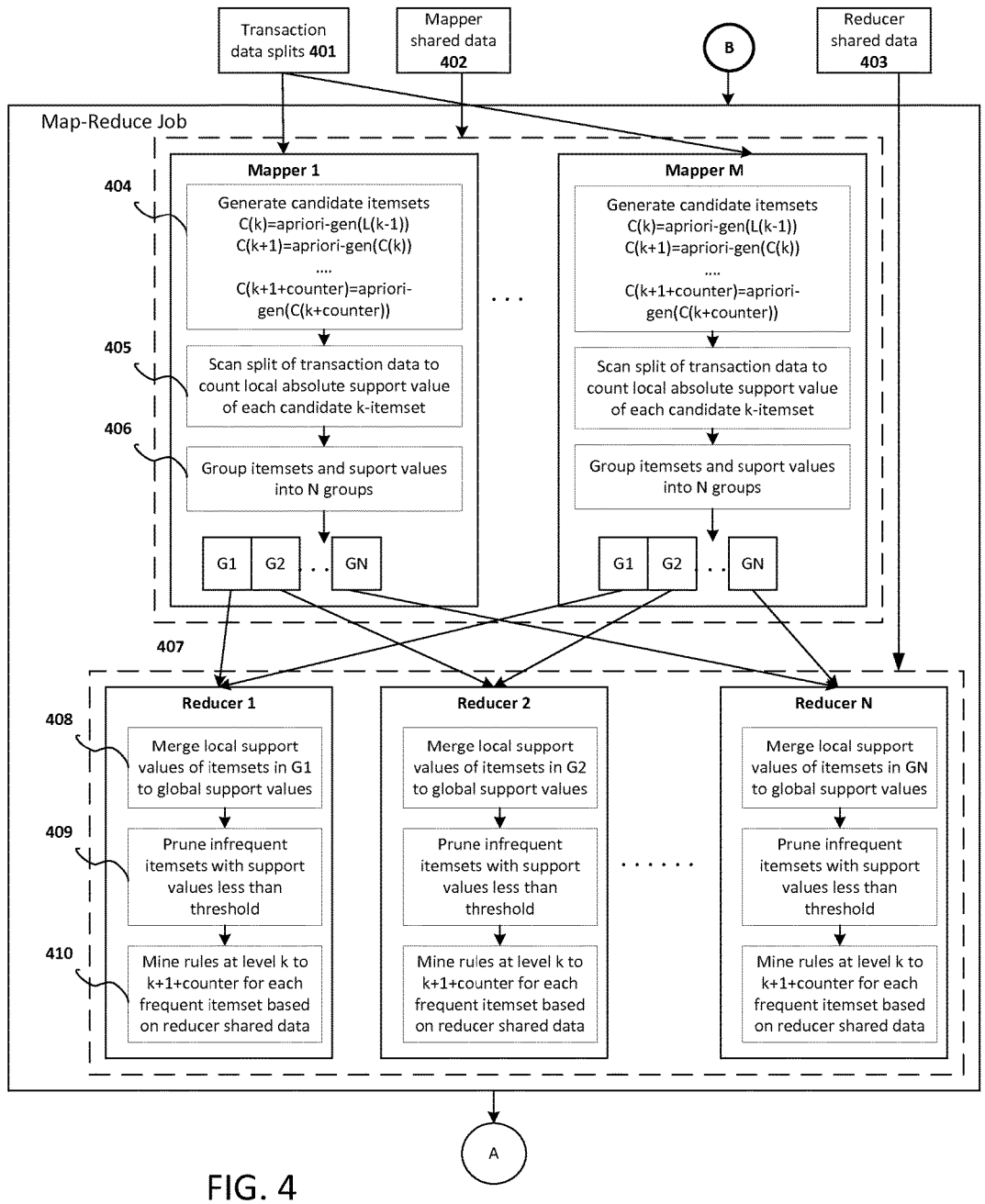
FIG. 4 illustrates a method for mining association rules in a map-reduce framework using the DPC algorithm according to embodiments of the present invention.

FIG. 4 illustrates a method for mining association rules in a map-reduce framework using the DPC algorithm according to embodiments of the present invention. The DPC algorithm combines layer searches of several levels in one data pass in order to reduce the total number of map-reduce jobs for layer search, which is done for the layers where the set of candidate itemsets is relatively small. Thus, the number of map-reduce jobs will be reduced to obtain better performance. The DPC algorithm calculates a threshold value called a candidate threshold (ct), which indicates the maximum number of candidates for counting in a mapper node 104 for the map-reduce phase. The DPC algorithm continuously generates and collects candidates of longer length until the total number of candidates is larger than the threshold. This way, the number of levels that will be combined in a data pass can be determined dynamically, striking a balance between reducing the number of map-reduce phases and the workload of mapper nodes 104 by increasing the number of counted candidates. The candidate itemsets for additional levels will be generated inside of map tasks if needed. The mapper shared data 402 has candidate itemsets $C_k$ for level k.

Transaction data splits 401, mapper shared data 402, and reducer shared data 403 are passed to the mapper nodes 104 and reducer nodes 105, in the same manner as set forth above with FIG. 3. Before processing the map-reduce job from level k, the main program 107 will compute the candidate threshold ct based on the latest completed frequent itemsets of level k-1. The candidate threshold ct is then passed to each mapper node 104 as part of the mapper shared data 402. In each map task, if the size of candidate itemsets $C_k$ is less than ct, then more candidate itemsets C(k+1), ... C(k+1+counter), where counter≥0, will be generated (404). In this embodiment, the candidate itemsets are generated according to the following:

Candidate threshold ct = α*| L(k−1)|;
$C_{set}$ = C(k) = apriori-gen(L(k−1));
for (cc = 0; |$C_{Set}$| ≤ ct; cc++)
    C(k+1+cc) = apriori-gen(C(k+cc));
    $C_{set}$ = $C_{set}$ ∪ C(k+1+cc);
end
counter = cc;

where apriori-gen(L(k−1)) is the function/process to generate candidate itemsets based on frequent/candidate itemset of the last level, such as to generate C(k) based on frequent itemsets L(k−1).

Using one data pass, every mapper node 104 scans the split of transaction data in order to count the local absolute support value of each candidate itemset (405). Then, the candidate itemsets for all levels from k to k+1+counter are grouped into N groups (406) and passed to the N reducer nodes 106 (407). The number N could be computed based on the total number of the candidate itemsets for all levels from k to k+1+counter and the maximum number of reduce tasks that can run in parallel on the cluster 100, with same method described above. Note that since all subsets of an itemset are needed for the calculation of the confidence during rule mining, the grouping of the itemsets for levels k to k+1+counter must be done so that all subsets of the itemset are grouped together in order for them to be passed to the same reducer node 105.

Each reducer node 105 merges the local support values of the itemsets into a global support value for its respective itemset group (G1, G2, . . . GN) (408). Each reducer node 105 prunes or removes the infrequent itemsets with global support values less than a minimum support threshold (409). Once the frequent itemsets are found, the reducer node 105 mines rules at level k to k+1+counter for each frequent itemset (410), using the frequent itemsets and their support values from previous iterations. The frequent itemsets and rules at levels k to k+1+counter are then exported by each reducer node 105 to the file system 106 (411). The main program 107 collects this data from the file system 106. The main program 107 then determines whether a search for subsequent levels is needed (412). If so, then the process 404-412 is repeated in the next map-reduce job. Otherwise, the process ends. The number of levels processed in the next map-reduce job can differ from the previous one, as it depends on the number of candidate itemsets in the new levels.

Figure 5:
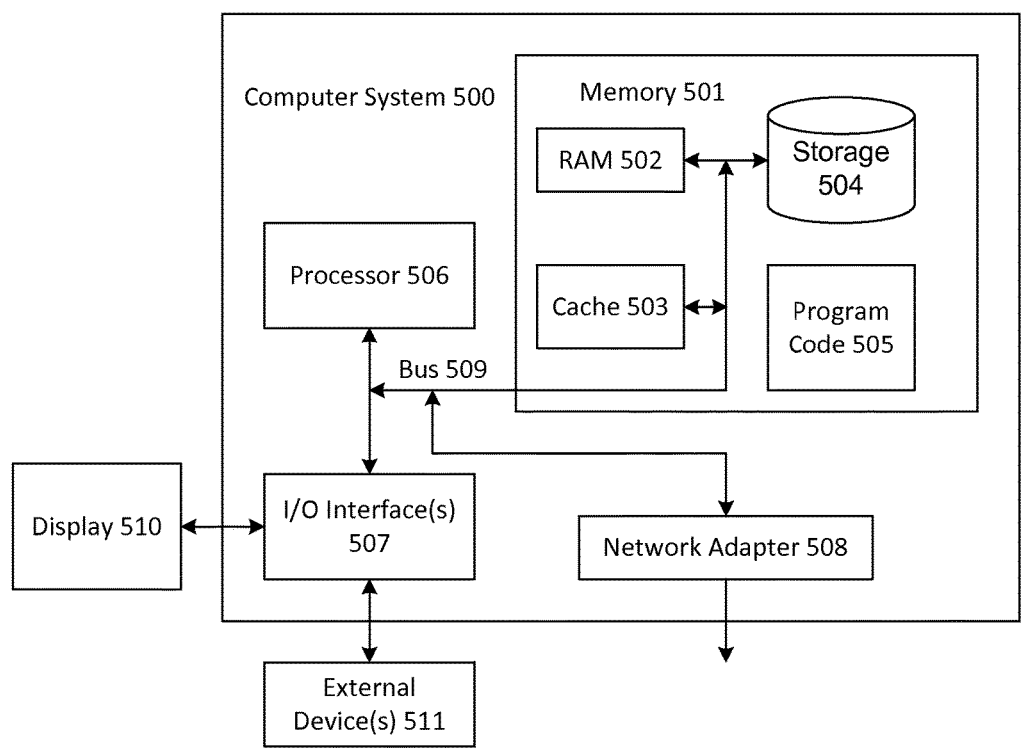
FIG. 5 illustrates a computer system according to embodiments of the present invention.

In one embodiment, each node illustrated in FIG. 1 may comprise one or more computer systems. FIG. 5 illustrates a computer system according to embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for mining association rules from transaction data by a cluster of computing systems, comprising:
    receiving a split of a plurality of splits of the transaction data by each mapper node of a plurality of mapper nodes in the cluster;
    for each mapper node,
        scanning the split to count an absolute support value of each candidate itemset for one or more current search levels, wherein the number of candidate itemsets varies at different search levels, and
        passing the candidate itemsets and the absolute support value of each candidate itemset to a plurality of reducer nodes in the cluster; and
    for each reducer node,
        grouping the candidate itemsets and the absolute support value of each candidate itemset into a plurality of groups, wherein a number of the groups in the plurality of groups is based on a number of the candidate itemsets and a maximum number of reduce tasks that can be run in parallel in the cluster, and wherein the number of reduce tasks varies at the different search levels to balance workloads in the cluster;
        combining the absolute support value of each candidate itemset received from each mapper node,
        finding frequent itemsets for the one or more current search levels, wherein the frequent itemsets comprise the candidate itemsets with the combined absolute support value satisfying a minimum support threshold,
        for each frequent itemset for the one or more current search levels, creating one or more association rules satisfying a minimum confidence threshold, wherein each association rule has an associated confidence value for each frequent itemset, and
        exporting each frequent itemset for each of the one or more current search levels and each created association rule to a file system for storage.

2. The method of claim 1, wherein for each reducer node:
    receiving the frequent itemsets and the absolute support values for the frequent itemsets of one or more previous search levels,
    wherein, for each frequent itemset for the one or more current search levels, the creating of the one or more association rules satisfying the minimum confidence threshold comprises:
        calculating a confidence of the rule using the frequent itemsets and the absolute support values of the one or more previous search levels, and
        determining whether the calculated confidence of the rule satisfies the minimum confidence threshold.

3. The method of claim 1, wherein a number of the reducer nodes driven in a map-reduce job is set equal to the number of groups.

4. The method of claim 1, wherein the combining of the absolute support value of each candidate itemset received from each mapper node comprises:
    merging the absolute support values of the candidate itemsets in the group to form global support values for the candidate itemsets in the group,
    wherein the finding of the frequent itemsets comprising the candidate itemsets with the combined absolute support value satisfying the minimum support threshold comprises: pruning infrequent itemsets in the group, the infrequent itemsets comprising the global support value less than the minimum support threshold.

5. The method of claim 1, further comprising:
    generating the candidate itemsets for a next search level from the frequent itemsets of one of the current search levels; and
    passing the candidate itemsets for the next search level to the plurality of mapper nodes.

6. The method of claim 5, further comprising:
    determining whether the candidate itemsets at the next search level could be generated;
    determining whether a maximum rule size has been reached; and
    in response to determining that the candidate itemsets at the next search level could not generated, or that the maximum rule size has been reached, ending the mining of the association rules from the transaction data.

* * * * *